Oct. 4, 1960  N. A. NELSON  2,954,693
FLUID METER

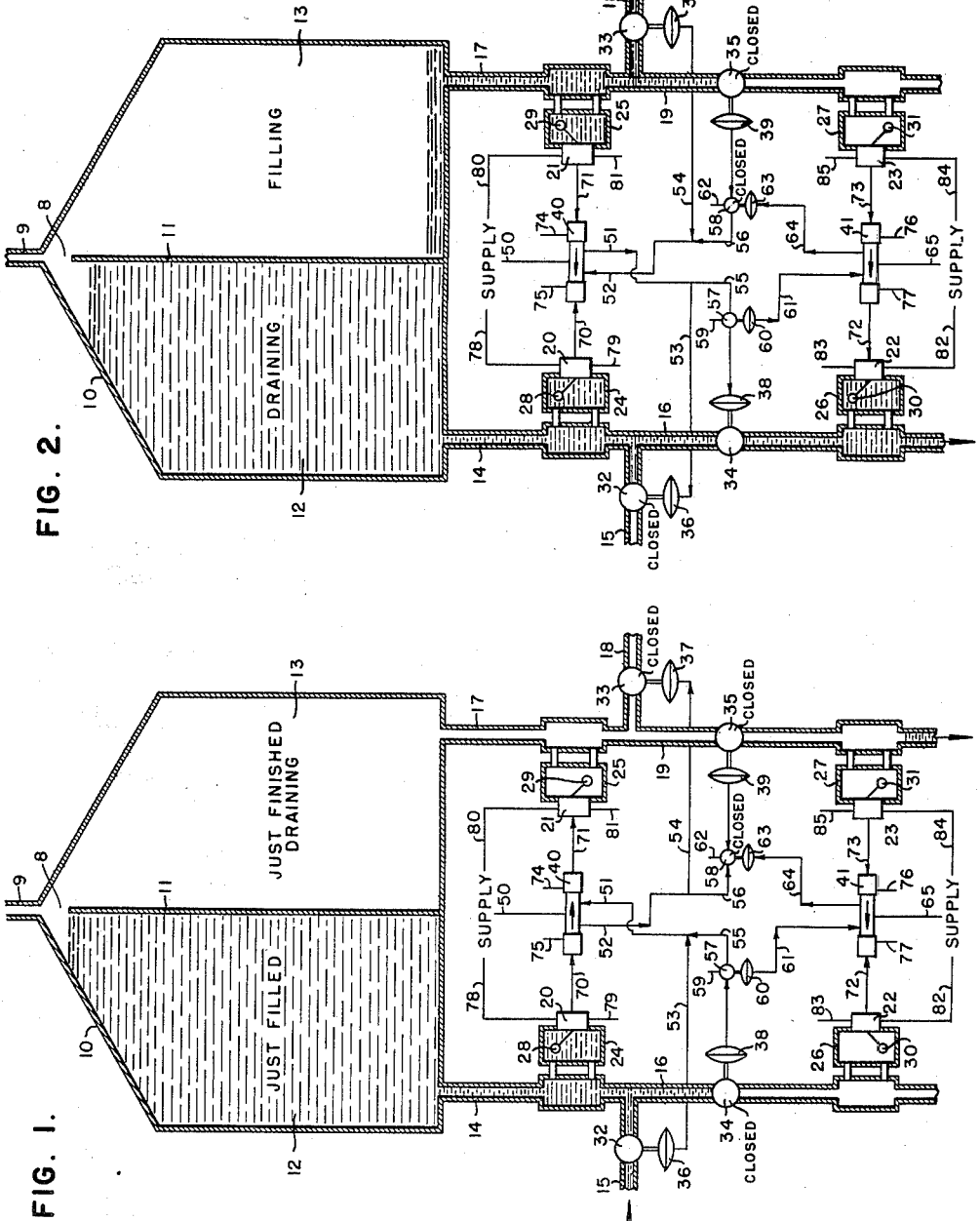

Filed July 24, 1957  3 Sheets-Sheet 2

INVENTOR.
Norman A. Nelson,
BY *John S. Schneider*
ATTORNEY.

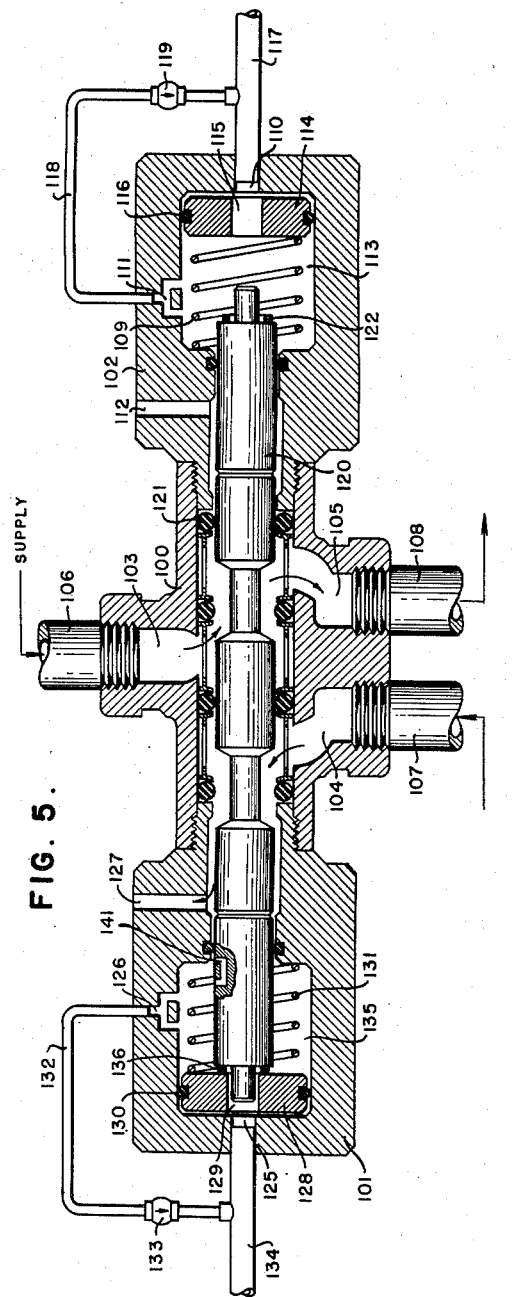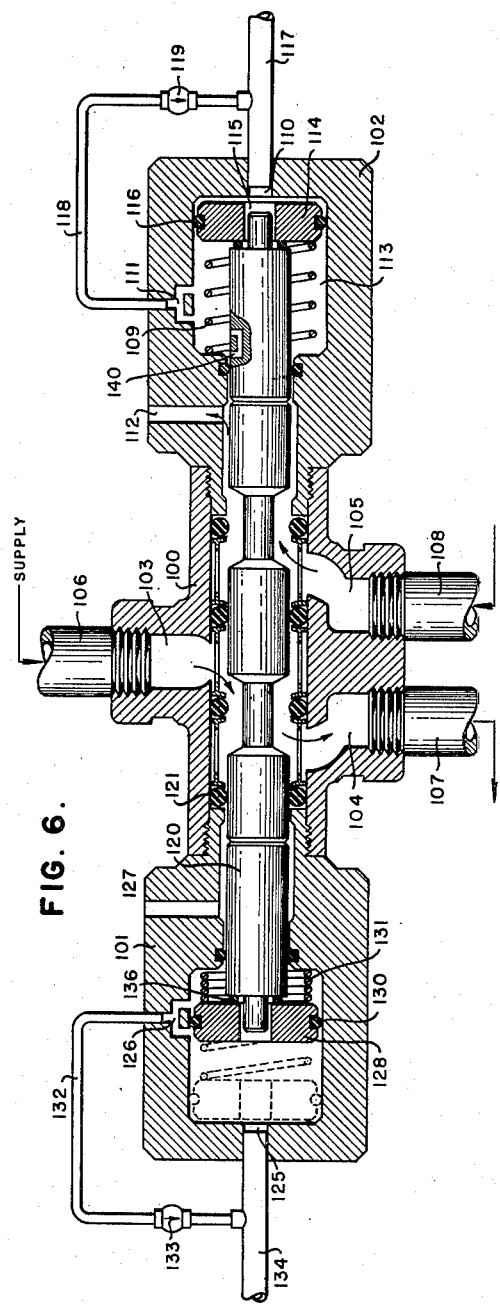

United States Patent Office 2,954,693
Patented Oct. 4, 1960

2,954,693

FLUID METER

Norman A. Nelson, Genoa, Tex., assignor, by mesne assignments, to Jersey Production Research Company, Tulsa, Okla., a corporation of Delaware Filed July 24, 1957, Ser. No. 673,785

1 Claim. (Cl. 73—221)

This invention concerns a positive volume fluid meter. More specifically this invention is directed to a dual compartment type fluid meter which measures a constant fixed body of liquid in each fill-discharge cycle.

Briefly, the invention comprises a tank provided with a partition member separating the tank into two compartments, the compartments being in fluid communication above said partition. Separate liquid inlet and outlet means fluidly communicate with each of said compartments and control means is provided in said liquid and outlet means operatively responsive to inlet and outlet flow to and from each of said compartments whereby when one of said compartments fills and overflows said partition, said one compartment discharges and said other compartment fills.

Therefore, one object of this invention is to provide a positive volume fluid meter adapted to make accurate volume measurements.

This and other objects of the invention will be apparent from a description of the invention taken with reference to the drawings wherein:

Figs. 1 through 4 show the meter according to the invention and the control system employed therewith indicating successive stages of a fill-discharge cycle;

Figs. 5 and 6 show, partly in section, the actuator employed in the control system.

Figure 4:
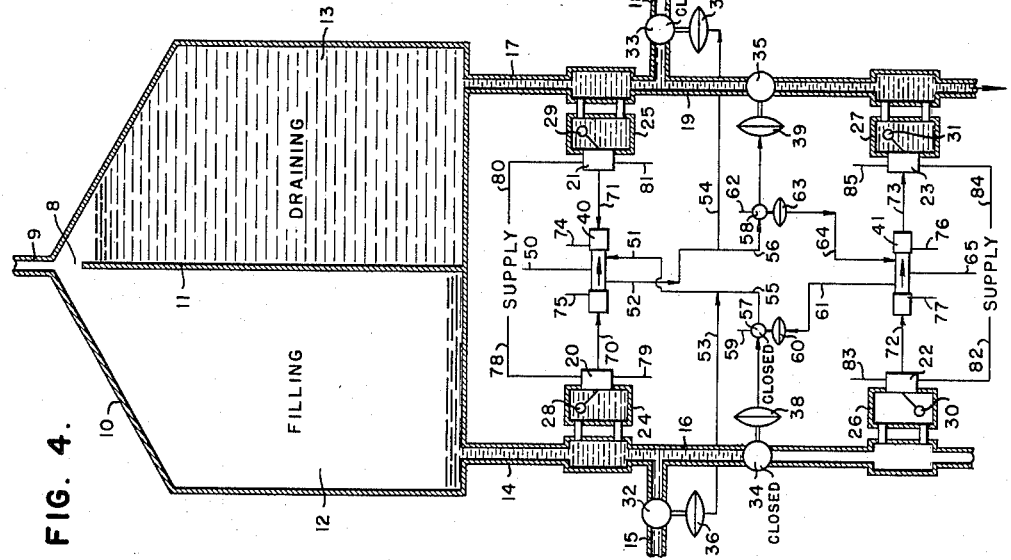

Referring more particularly to the drawings:

In Figs. 1 through 4 a metering tank or vessel 10 is shown provided with a partition or baffle member 11 extending substantially the length of vessel 10. The partition 11 divides vessel 10 into two equal volume chambers 12 and 13. Vessel 10 is formed to provide a vent or gas equalizer opening 9 which fluidly communicates with chambers 12 and 13 above the baffle or partition 11. As shown, the compartments 12 and 13 fluidly communicate with each other via a space, indicated by numeral 8, above partition 11. A conduit 14 is connected to vessel 10 and fluidly communicates with compartment 12. Inlet and discharge conduits 15 and 16, respectively, connect with conduit 14. Similarly, a conduit 17 is connected to vessel 10 and fluidly communicates with compartment 13. Inlet and discharge conduits 18 and 19, respectively, are connected to conduit 17. A series of float actuated pilot valves 20, 21, 22, and 23, which may be of any conventional type, are positioned adjacent conduits 14, 17, 16, and 19, respectively. Fluid volume chambers 24, 25, 26, and 27 are associated with each of the valves 20, 21, 22, and 23, respectively, and fluidly communicate with conduits 14, 16, 17, and 19, respectively, as shown. Suitable floats 28, 29, 30, and 31, which are adapted to actuate the various valves associated therewith, are positioned in chambers 24, 25, 26, and 27, respectively. Fluid pressure operated spring-biased diaphragm type valves 32, 33, 34, and 35 are positioned in conduits 15, 18, 16, and 19, respectively. This type valve, which also may be of any conventional type, is adapted to actuate to one position against the bias of a spring upon application of a fluid pressure signal to the diaphragm and to actuate to another position under the bias of the spring upon exhaust of fluid pressure from the diaphragm. Herein, valves 32 and 33 are adapted to close upon application of pressure signals or pulses to diaphragms 36 and 37, respectively, and to open upon exhaust of fluid pressure from diaphragms 36 and 37, respectively; valves 34 and 35 are adapted to open upon application of fluid pressure pulses to diaphragms 38 and 39, respectively, and to close upon the exhaust of fluid pressure from diaphragms 38 and 39, respectively.

Two identical actuators 40 and 41, seen in detail in Figs. 5 and 6, are connected in the control system. Actuator 40 fluidly communicates with valves 20 and 21 and actuator 41 fluidly communicates with valves 22 and 23.

A plurality of conduits interconnect the various diaphragms and valving arrangements described supra. A conduit 50 is connected to actuator 40 and fluidly communicates a source of fluid pressure supply to a conduit 51 when actuator 40 is in one position and to a conduit 52 when actuator 40 is in another position. Conduits 51 and 52 fluidly communicate with diaphragms 36 and 37, respectively, via conduits 53 and 54. Also conduits 51 and 52 fluidly communicate with diaphragms 38 and 39 via conduits 55 and 56, respectively. A spring-biased diaphragm type valve 57 is positioned in conduit 55 and a spring-biased diaphragm type valve 58 is positioned in conduit 56. Valve 57 is adapted to close and bleed or exhaust diaphragm 38 to an exhaust conduit 59 upon application of fluid pressure to a diaphragm 60 of valve 57. Similarly, valve 58 is adapted to close and bleed or exhaust diaphragm 39 to an exhaust conduit 62 upon application of fluid pressure to a diaphragm 63 of valve 58. Valves 57 and 58 are adapted to open upon the exhaust of fluid pressure from diaphragms 60 and 63, respectively. Conduits 61 and 64 fluidly communicate actuator 41 and diaphragms 60 and 63, respectively.

Actuator 41 is adapted to fluidly communicate a source of fluid pressure supply through a conduit 65 to conduit 61 when actuator 41 is in one position and to fluidly communicate conduit 65 and conduit 64 when actuator 41 is in another position. Actuator 40 fluidly communicates with valves 20 and 21 via conduits 70 and 71, respectively, and actuator 41 fluidly communicates with valves 22 and 23 via conduits 72 and 73, respectively. Also, actuator 40 has connected thereto exhaust conduits 74 and 75 which are adapted to connect with exhaust openings 112 and 127, as seen in Figs. 5 and 6. Similarly, actuator 41 has connected thereto exhaust conduits 76 and 77.

Valve 20 has connected thereto an exhaust conduit 79, and a conduit 78, which latter fluidly communicates with the source of fluid pressure. Similarly, valve 21 is provided with conduits 80, 81; valve 22 with conduits 82, 83; and valve 23 with conduits 84, 85.

The actuators are adapted to bleed or exhaust conduits 51, 52, 61 and 64 when a fluid pressure signal is not being applied to the respective conduit.

The actuators employed in the control system are illustrated in Figs. 5 and 6 and are described in detail in U.S. patent application Serial No. 670,674, filed July 9, 1957, entitled "Pneumatic Actuator," by Stephen S. Brown. The actuator is not a part of the present invention. It is considered within the scope of the invention to employ any desired system of controls for effecting automatic fill and discharge of the metering vessel. However, the control system described and shown herein is preferred.

With reference to Figs. 5 and 6, there is shown a casing 100 connected at each end to housings 101 and 102. Housing 100 is formed to provide openings 103, 104, and 105. Connected to opening 103 is a conduit 106, which is adapted to be connected to a source of fluid pressure supply. Suitable conduits 107 and 108 are connected to openings 104 and 105, respectively. These conduits connect to the diaphragms of the various valves. The housings 101 and 102 are identical in construction. Thus, housing 102 is formed to provide an inlet and outlet opening 110, an equalizer opening 111, and an exhaust opening 112. Arranged in the chamber 113 enclosed by housing 102 is a piston 114 formed to provide an opening 115 extending therethrough. Suitable sealing means such as an O-ring 116 is arranged on the piston 114 and adapted to sealingly engage the inner walls of housing 102. Also, arranged in chamber 113 is a spring or biasing means 109, which is adapted to bias piston 114 in the direction of opening 110. Conduit 117 is connected to opening 110 and a conduit 118 interconnects the equalizer opening 111 and conduit 117. Arranged in conduit 118 is a check valve 119, which is adapted to prevent fluid flow from conduit 117 to equalizer opening 111 and to permit fluid flow from opening 111 to conduit 117. Similarly, in the left-hand side of Figs. 5 and 6 associated with housing 101 is shown an inlet and outlet opening 125, an equalizer opening 126, an exhaust opening 127, a piston 128, an opening 129, a sealing means 130, a biasing means 131, a conduit 132, a check valve 133, a conduit 134, and a chamber 135.

A valve plunger 120 is arranged in housing 100 and extends into chambers 113 and 135. Suitable sealing means 121, which may be O-ring seals, as shown, are provided in housing 100 adapted to engage with plunger 120 in order to selectively control fluid flow through conduits 106, 107, and 108 and through the exhaust openings 112 and 127 in housings 102 and 101, respectively. Suitable sealing means 122 and 136, which also may be O-ring seals, are arranged adjacent the ends of plunger 120 adapted to engage pistons 114 and 128, respectively, and seal off the openings 115 and 129, respectively. Plunger 120 is also provided with by-pass openings 140 and 141, which openings are adapted to exhaust chambers 113 and 135, respectively, when plunger 120 moves to predetermined positions.

In operation, as seen in Fig. 5, a fluid pressure signal transmitted through conduit 117 acts on the piston 114 and engaged plunger 120 to move the plunger to the left-hand position. In this movement, when piston 114 reaches equalizer opening 111, the pressure on each side side of the piston is equalized by means of conduit 118, check valve 119, conduit 117, and opening 110, and under the bias of spring 109 the piston moves to its original position; however, plunger 120 remains in the left-hand position.

As seen more clearly in Fig. 6, although fluid pressure is continuously transmitted through conduit 117, a fluid pressure signal transmitted through conduit 134 into chamber 135 in housing 101 moves piston 128 and engaged plunger 120 to the right-hand position. Plunger 120 is maintained in this position even though a fluid pressure signal is maintained in conduit 117. In the position of plunger 120 in Fig. 5, conduit 106 supplies fluid pressure to conduit 108 and exhausts conduit 107 to the exhaust opening 127 in housing 101. Similarly, with plunger 120 in the position shown in Fig. 6, conduit 106 supplies fluid pressure to conduit 107 and exhausts conduit 108 to exhaust opening 112 in housing 102.

A clearer understanding of the operation of the actuator will be had from a description of the operation of the metering vessel of the present invention, which description is as follows:

Valves 20 and 21 operate such that a fluid pressure signal is transmitted through conduits 70 and 71, respectively, to actuator 40 when floats 28 and 29, respectively, are in the "up" positions and exhaust conduits 70 and 71 to conduits 79 and 81, respectively, when floats 28 and 29 are in the "down" positions.

Valves 22 and 23, on the other hand, operate such that a fluid pressure signal is transmitted through conduits 72 and 73, respectively, to actuator 41 when floats 30 and 31, respectively, are in the "down" positions and exhaust conduits 72 and 73 to conduits 77 and 76, respectively, when the floats 30 and 31 are in the "up" positions.

In Fig. 1, assuming chamber 12 has just filled and chamber 13 has just completed draining, float 28 is in the "up" position in which position a fluid pressure signal from the fluid pressure source is transmitted through conduit 78 and through valve 20 to conduit 70. The float 29 in chamber 25 is in the "down" position, which position exhausts conduit 71 through valve 21 to exhaust 81. Thus, the plunger of actuator 40 is in the position such that conduit 51 is exhausting to conduit 74 and conduit 50 is transmitting fluid pressure to conduit 52, as indicated by the arrow over the actuator 40. Also, float 30 in chamber 26 is in the "down" position in which position fluid pressure from the fluid pressure supply is transmitted to conduit 72 through conduit 82 and valve 22. Float 31, in chamber 27, is also in the "down" position, in which position fluid pressure is transmitted to conduit 73 through conduit 84 and valve 23. The plunger of actuator 41 is in a position, as indicated by the arrow such that a pressure signal is transmitted to conduit 64 from conduit 65 and conduit 61 is exhausting to conduit 77.

Thus, the fluid pressure signal transmitted to diaphragm 37 through conduits 52 and 54 closes valve 33. Conduit 51 is exhausting which exhausts conduit 53 and diaphragm 36 thereby opening valve 32. Conduit 61 is exhausting fluid pressure from diaphragm 60 and conduit 64 is transmitting fluid pressure to diaphragm 63. In these positions valve 57 is open and valve 58 is closed; however, in the closed position of valve 58 the fluid pressure on diaphragm 39 exhausts through conduit 62. The fluid pressure on diaphragm 38 exhausts through open valve 57. Thus, valve 34 is closed and valve 35 is closed.

When chamber 12 fills completely, the liquid overflows the partition or baffle 11 into chamber 13. Upon this occurrence, as seen in Fig. 2, fluid flow in conduit 17 moves float 29 to the "up" position whereby a pressure signal is transmitted from the fluid pressure source to conduit 71 through conduit 80 and valve 21. This fluid pressure signal causes movement of actuator 40 to a position such that the signals in conduits 51 and 52 are changed. Thus, fluid pressure in conduits 52 and 54 exhaust to conduit 75 and conduit 50 transmits a fluid pressure signal to conduits 51, 53, and diaphragm 36, which closes valve 32 to stop further flow into chamber 12 and opens valve 33 to start the filling of chamber 13.

Since valve 57 is open, a fluid pressure signal is transmitted through conduits 51 and 55 to diaphragm 38 of valve 34 which opens valve 34 to start the discharge of chamber 12. Valve 58 remains closed at this time. As chamber 12 begins to discharge, float 30 in chamber 26 moves to the "up" position, which exhausts conduit 72 to conduit 83. However, the position of the plunger in actuator 41 remains the same. Therefore, valves 57 and 58 remain open and closed and bleeding, respectively.

Figure 3:
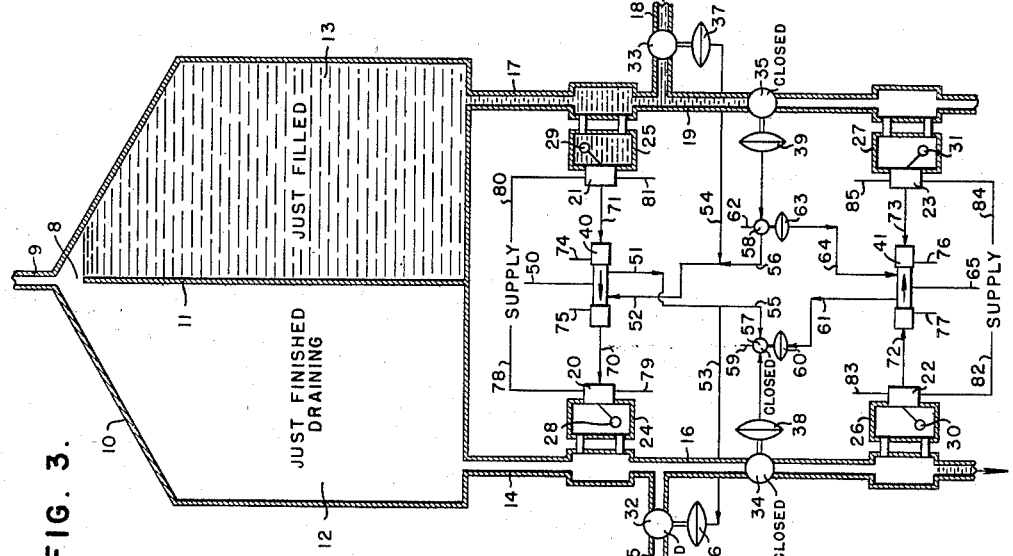

As seen in Fig. 3, when chamber 12 finishes draining, float 28 moves to the "down" position whereby conduit 70 exhausts to conduit 79. Exhaust of the fluid pressure signal in conduit 70 does not affect movement of the plunger in actuator 40. Therefore, the fluid pressure signal transmitted to conduit 51 is maintained and the exhaust of conduit 52 continues which maintains valve 32 closed and valve 33 open. Float 30 in chamber 26 moves to the "down" position, in which position a fluid pressure signal is transmitted to conduit 72 through conduit 82 and valve 22. This changes the position of the plunger of actuator 41 and thereby actuates valves 57 and 58. Thus, a fluid pressure signal is applied to diaphragm 60, which closes valve 57 and exhausts fluid pressure on diaphragm 38 to conduit 59, which closes valve 34. Conduit 64 exhausts fluid pressure on diaphragm 63 which opens valve 58; however, since conduit 52 is exhausting, valve 35 remains closed. Since valves 35 remains closed, float 31 in chamber 27 remains in the "down" position and a fluid pressure signal is maintained in conduit 73; however, the position of the plunger of actuator 41 remains unchanged.

After chamber 12 finishes draining and chamber 13 overflows into chamber 12, as seen in Fig. 4, float 28 in chamber 24 moves to the "up" position thereby applying a fluid pressure signal to conduit 70, which moves the plunger of actuator 40. This movement changes the signals in conduits 51 and 52 to apply a pressure signal to diaphragm 37 of valve 33, which closes valve 33 and exhausts fluid pressure from diaphragm 36 of valve 32, which opens valve 32. Thus, chamber 12 begins to fill. Also, the fluid pressure signal transmitted through conduit 52 is applied to diaphragm 39 of valve 35, which opens valve 35 and chamber 13 begins to discharge. This moves float 31 in chamber 27 to the "up" position thereby exhausting conduit 73 to exhaust 85. However, the plunger of actuator 41 does not move and valves 57 and 58 are maintained closed and open, respectively. Thus, a full cycle of operation is completed and the cycle then is repeated.

Although the invention has been shown and described herein as one tank provided with a partition member separating the tank into two compartments, various modifications of such apparatus will be apparent, as for example, two tanks in fluid communication at the upper ends thereof.

Having fully described the objects, elements, and operation of my invention, I claim:

In a metering system a stationary tank provided with a partition member extending upwardly from the bottom thereof dividing said tank into two separate equal volume compartments, the upper end of said partition member terminating below the uppermost portion of said tank, separate liquid inlet and outlet conduits connected to and fluidly communicating with the bottom of each of said compartments and automatic control means including means positioned on each of said inlet and outlet conduits operative in response to inlet and outlet fluid flow to and from each of said compartments in a manner such that when one of said compartments fills and overflows said partition into said other compartment said one compartment begins discharge and said other compartment begins to fill and when said other compartment overflows said partition into said one compartment said other compartment begins discharge and said one compartment begins to fill.

References Cited in the file of this patent

UNITED STATES PATENTS

| | | |
|---|---|---|
| 116,859 | Nickerson | July 11, 1871 |
| 498,314 | Skinner | May 30, 1893 |
| 1,303,820 | Lanaux | May 13, 1919 |
| 2,158,381 | Raymond | May 16, 1939 |
| 2,211,282 | McKeever | Aug. 13, 1940 |
| 2,831,350 | Banks et al. | Apr. 22, 1958 |